US012791424B2

(12) United States Patent
Mori et al.

(10) Patent No.: US 12,791,424 B2
(45) Date of Patent: Nov. 10, 2026

(54) TOWER DETERIORATION DETECTION DEVICE, TOWER DETERIORATION DETECTION SYSTEM, AND TOWER DETERIORATION DETECTION METHOD

(71) Applicant: NEC Corporation, Tokyo (JP)

(72) Inventors: Koyo Mori, Tokyo (JP); Yukihide Yoda, Tokyo (JP); Naoto Ogura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 433 days.

(21) Appl. No.: 18/279,178

(22) PCT Filed: Mar. 4, 2021

(86) PCT No.: PCT/JP2021/008372
§ 371 (c)(1),
(2) Date: Aug. 28, 2023

(87) PCT Pub. No.: WO2022/185468
PCT Pub. Date: Sep. 9, 2022

(65) Prior Publication Data

US 2024/0142338 A1 May 2, 2024

(51) Int. Cl.
*G01M 5/00* (2006.01)

(52) U.S. Cl.
CPC ........ *G01M 5/0066* (2013.01); *G01M 5/0025* (2013.01); *G01M 5/0091* (2013.01)

(58) Field of Classification Search
CPC . G01M 5/0066; G01M 5/0025; G01M 5/0091
See application file for complete search history.

(56) References Cited

U.S. PATENT DOCUMENTS

| | | | | |
|---|---|---|---|---|
| 5,083,451 | A * | 1/1992 | Kling | G01M 3/3254 73/40 |
| 9,450,392 | B2 * | 9/2016 | Erichsen | F03D 17/00 |
| 12,345,061 | B2 * | 7/2025 | Madsen | E04H 12/085 |
| 2016/0286286 | A1 * | 9/2016 | Brinker | H04Q 9/00 |
| 2017/0102234 | A1 * | 4/2017 | Oshetski | G01R 31/088 |
| 2019/0353553 | A1 * | 11/2019 | Woodbridge | G01M 5/0025 |
| 2021/0140845 | A1 * | 5/2021 | Parker | G01M 3/243 |
| 2021/0247215 | A1 * | 8/2021 | Yoda | G02B 6/48 |

(Continued)

FOREIGN PATENT DOCUMENTS

| | | |
|---|---|---|
| JP | H05-83876 B2 | 11/1993 |
| JP | H07-280639 A | 10/1995 |
| JP | 2002-152937 A | 5/2002 |

(Continued)

OTHER PUBLICATIONS

JP 2001311749 A (Year: 2001).*

(Continued)

*Primary Examiner* — Thomas D Alunkal

(57) ABSTRACT

The purpose of the present invention is to provide a tower deterioration detection device and the like capable of detecting deterioration of a tower. A tower deterioration detection device includes: an optical signal reception unit for receiving an optical signal from an optical fiber cable laid in a tower; and a deterioration detection unit for detecting deterioration of the tower on the basis of a vibration pattern of the tower indicated by the optical signal.

19 Claims, 13 Drawing Sheets

(56) References Cited

U.S. PATENT DOCUMENTS

2024/0118126 A1* 4/2024 Okamoto ............... G01H 9/004

FOREIGN PATENT DOCUMENTS

JP 2018-031718 A 3/2018
WO 2020/044655 A1 3/2020

OTHER PUBLICATIONS

International Search Report for PCT Application No. PCT/JP2021/008372, mailed on May 11, 2021.
English translation of Written opinion for PCT Application No. PCT/JP2021/008372, mailed on May 11, 2021.

* cited by examiner

| DISTANCE INFORMATION | IDENTIFICATION INFORMATION |
|---|---|
| xx km | TOWER1_1 |
| yy km | TOWER1_2 |
| zz km | TOWER1_3 |

Fig.10

| VIBRATION DATA | TEACHER DATA | |
|---|---|---|
| VIBRATION PATTERN A | TOWER1_1 | NO DETERIORATION |
| VIBRATION PATTERN B | TOWER1_1 | DETERIORATION (DETERIORATION DEGREE OF 1) |
| VIBRATION PATTERN C | TOWER1_1 | DETERIORATION (DETERIORATION DEGREE OF 2) |
| VIBRATION PATTERN D | TOWER1_2 | NO DETERIORATION |
| VIBRATION PATTERN E | TOWER1_2 | DETERIORATION (DETERIORATION DEGREE OF 1) |
| VIBRATION PATTERN F | TOWER1_2 | DETERIORATION (DETERIORATION DEGREE OF 2) |
| VIBRATION PATTERN G | TOWER1_3 | NO DETERIORATION |
| VIBRATION PATTERN H | TOWER1_3 | DETERIORATION (DETERIORATION DEGREE OF 1) |
| VIBRATION PATTERN I | TOWER1_3 | DETERIORATION (DETERIORATION DEGREE OF 2) |

Fig.13

| DISTANCE INFORMATION | IDENTIFICATION INFORMATION | ADDITIONAL INFORMATION | | |
|---|---|---|---|---|
| | | MATERIAL | HEIGHT | CONSTRUCTION YEAR OR INSTALLATION YEAR |
| xx km | TOWER1_1 | COPPER PIPE | 10 | 50 |
| yy km | TOWER1_2 | COPPER PIPE | 20 | 15 |
| zz km | TOWER1_3 | CONCRETE | 30 | 80 |

TOWER DETERIORATION DETECTION DEVICE, TOWER DETERIORATION DETECTION SYSTEM, AND TOWER DETERIORATION DETECTION METHOD

This application is a National Stage Entry of PCT/JP2021/008372 filed on Mar. 4, 2021, the contents of all of which are incorporated herein by reference, in their entirety.

TECHNICAL FIELD

The present disclosure relates to a tower deterioration detection device and the like.

BACKGROUND ART

PTL 1 discloses a technique of locating an accident point in an overhead power distribution system. Specifically, first, a pulse generation device that generates a pulsed input wave is installed. The input wave contains a frequency component associated with a spatial resolution required for locating an accident point. Second, there is installed a measurement device that measures at least one of a time waveform of a potential, a time waveform of a current, and a time waveform of a voltage in the overhead power distribution system. Based on a time difference between application of the input wave and generation of reflected wave associated with the input wave, a distance to an accident point is calculated (see, for example, Abstract of PTL 1).

As a technique in the related art, a technique described in PTL 2 is also known.

CITATION LIST

Patent Literature

PTL 1: Japanese Unexamined Patent Application Publication No. 2018-31718

PTL 2: International Patent Publication No. WO 2020/044655

SUMMARY OF INVENTION

Technical Problem

In general, a power transmission system includes a tower for power transmission. Further, a power distribution system includes a tower for power distribution. The technique described in PTL 1 is for locating an accident point in an overhead power distribution system. In other words, the technique described in PTL 1 is not for detecting deterioration of such a tower. Thus, there is a problem that deterioration of such a tower cannot be detected.

The present disclosure has been made in order to solve the above-mentioned problem, and an object thereof is to provide a tower deterioration detection device and the like capable of detecting deterioration of a tower.

Solution to Problem

One aspect of a tower deterioration detection device according to the present disclosure includes: an optical signal reception means for receiving an optical signal from an optical fiber cable provided to a tower; and a deterioration detection means for detecting deterioration of the tower, based on a vibration pattern of the tower that is indicated in the optical signal.

One aspect of a tower deterioration detection method according to the present disclosure includes: receiving, by an optical signal reception means, an optical signal from an optical fiber cable provided to a tower; and detecting deterioration of the tower by a deterioration detection means, based on a vibration pattern of the tower that is indicated in the optical signal.

Advantageous Effects of Invention

According to the present disclosure, deterioration of a tower can be detected.

BRIEF DESCRIPTION OF DRAWINGS

FIG. 10 is an explanatory diagram illustrating an example of data used for machine learning.

FIG. 13 is an explanatory diagram illustrating another example of tower information used by the deterioration detection unit.

EXAMPLE EMBODIMENT

With reference to the drawings, example embodiments of the present disclosure are described below.

First Example Embodiment

Figure 16:
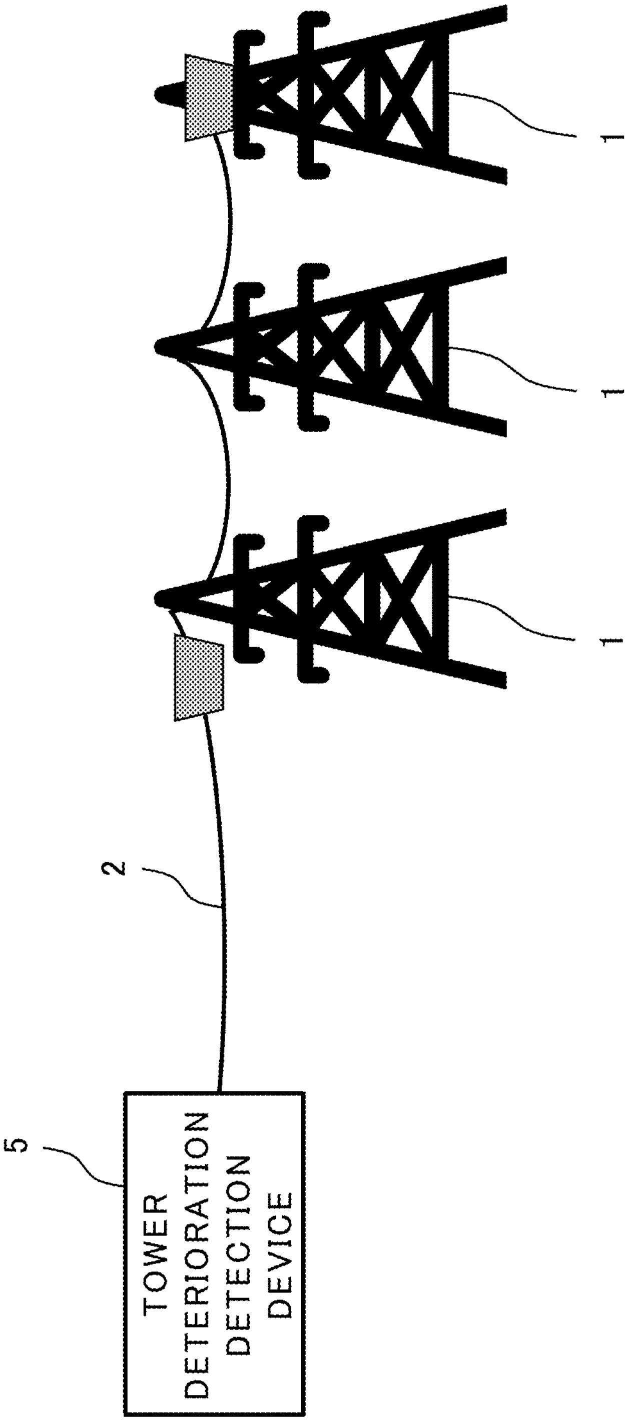
FIG. 16 is an explanatory diagram illustrating an installation example of a tower deterioration detection device according to a first example embodiment and an optical fiber cable provided overhead via a plurality of towers.

FIG. 16 is an explanatory diagram illustrating a tower deterioration detection device according to a first example embodiment. With reference to FIG. 16, the tower deterioration detection device according to the first example embodiment is described.

As illustrated in FIG. 16, an optical fiber cable 2 is provided overhead via a plurality of towers 1. A tower deterioration detection device 5 is provided at one end of the optical fiber cable 2. The tower deterioration detection device 5 includes the following functions.

In other words, the tower deterioration detection device 5 outputs an optical signal to the optical fiber cable 2. With this, back scattered light is generated inside the optical fiber cable 2. The tower deterioration detection device 5 receives an optical signal associated with the back scattered light being generated. In other words, the tower deterioration detection device 5 receives the optical signal from the optical fiber cable 2. The optical signal being received includes a pattern that differs according to vibration of each of the towers 1. The tower deterioration detection device 5 detects deterioration of each of the towers 1, based on the pattern by using the optical signal being received. Details of the tower deterioration detection device 5 are described later in a second example embodiment.

By using the tower deterioration detection device 5 as described above, deterioration of the tower 1 can be detected.

Second Example Embodiment

Figure 1:
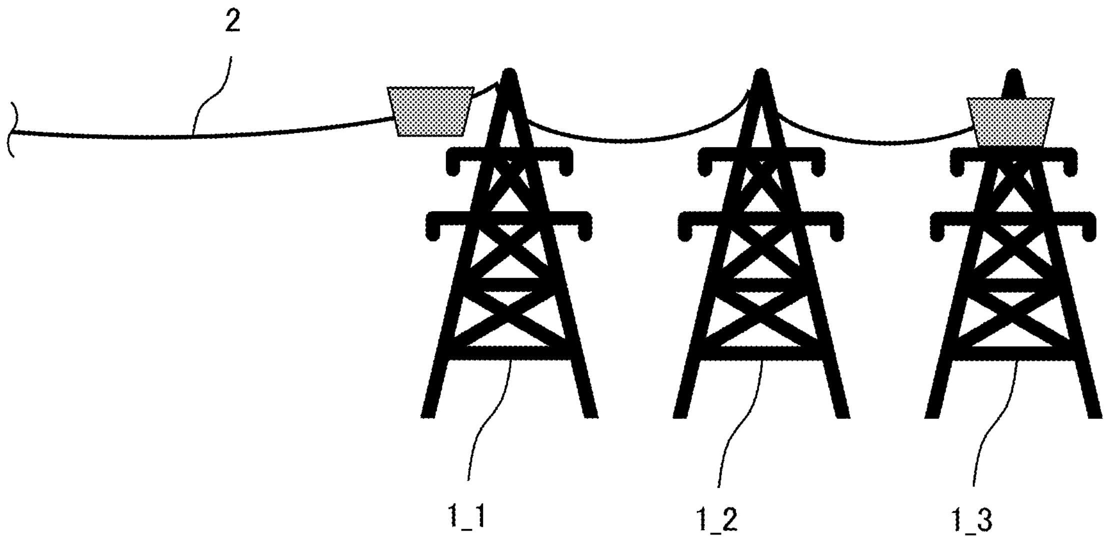
FIG. 1 is an explanatory diagram illustrating an installation example of an optical fiber cable provided overhead via a plurality of towers.
Figure 2:
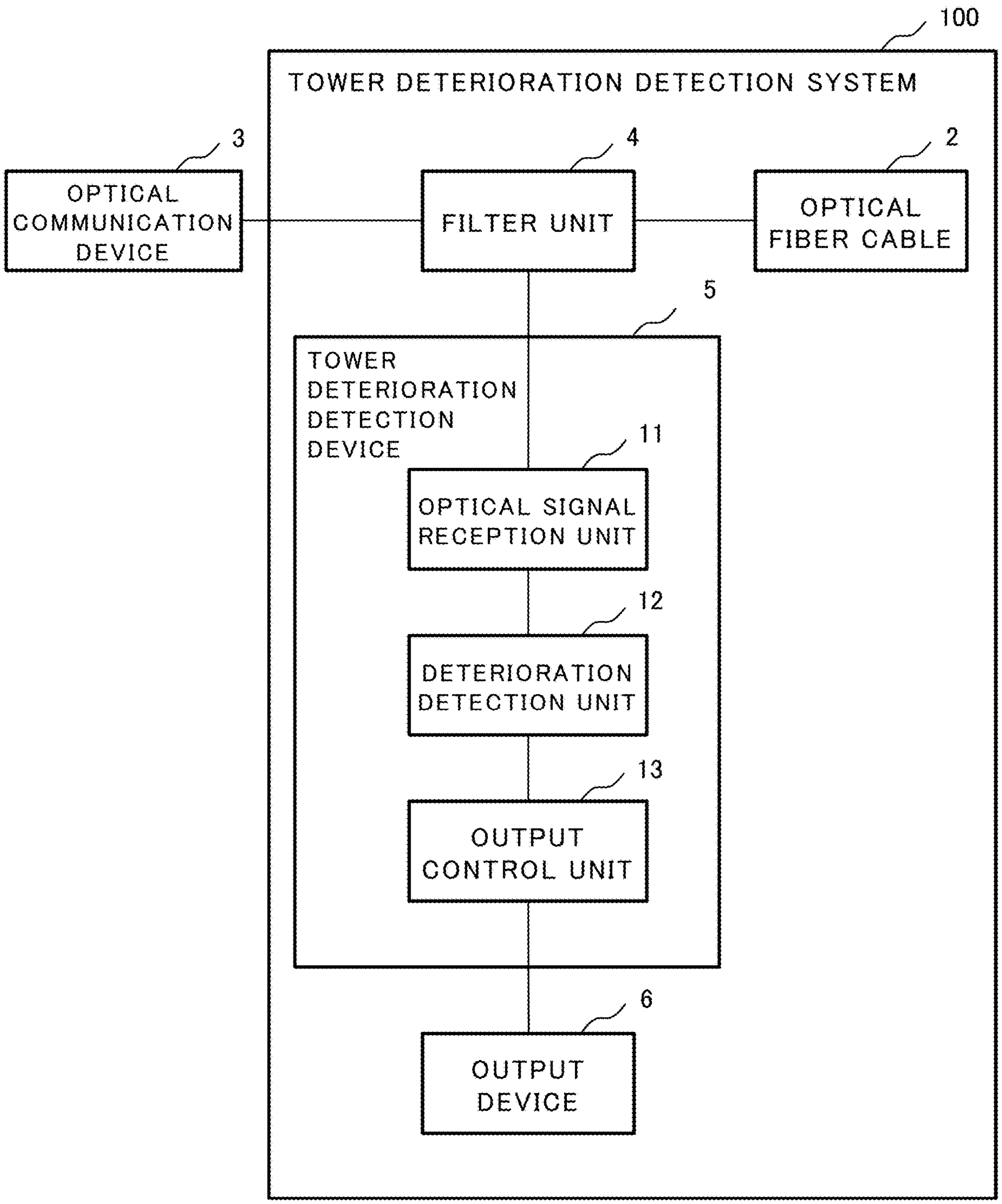
FIG. 2 is a block diagram illustrating main parts of a tower deterioration detection system according to a second example embodiment.

FIG. 1 is an explanatory diagram illustrating an installation example of an optical fiber cable provided overhead via a plurality of towers. FIG. 2 is a block diagram illustrating main parts of a tower deterioration detection system according to the second example embodiment. With reference to FIG. 1 and FIG. 2, the tower deterioration detection system according to the second example embodiment is described.

As illustrated in FIG. 1, the optical fiber cable 2 is installed overhead via N towers 1_1 to 1_N. Herein, N is an integer equal to or greater than 2. In the example illustrated in FIG. 1, N=3. The towers 1_1 to 1_N are included in a power transmission network or a power distribution network. In other words, the towers 1_1 to 1_N are for power transmission or power distribution. The optical fiber cable 2 is for communication or sensing. The optical fiber cable 2 may be provided inside an overhead ground wire. In other words, the optical fiber cable 2 may be configured by using an optical fiber composite overhead ground wire (OPGW).

As an example, a case in which the optical fiber cable 2 is for communication is mainly described below. The optical fiber cable 2 is used for communication established by an optical communication device 3 (see FIG. 2). The optical communication device 3 is configured by using a terminal device for the OPGW, for example. The optical communication device 3 is installed in a building for the OPGW, for example.

As illustrated in FIG. 2, a tower deterioration detection system 100 includes the optical fiber cable 2, a filter unit 4, the tower deterioration detection device 5, and an output device 6. The tower deterioration detection device 5 includes an optical signal reception unit 11, a deterioration detection unit 12, and an output control unit 13.

The filter unit 4 is provided between the optical fiber cable 2, the optical communication device 3, and the tower deterioration detection device 5. When an optical signal from the optical communication device 3 is input, the filter unit 4 outputs the optical signal being input, to the optical fiber cable 2. Further, when an optical signal from the optical fiber cable 2 is input, the filter unit 4 separates a component associated with back scattered light in the signal light being input, and outputs the component to the tower deterioration detection device 5. The filter unit 4 is configured by using a wavelength filter (more specifically, a three-port wavelength division multiplex filter). With the wavelength filter, an optical signal (having a specific wavelength) being input from the optical communication device 3 is not output to the tower deterioration detection device 5, but is output to the optical fiber cable 2. In contrast, a component having another specific wavelength (containing a component associated with back scattered light) in the optical signal being input from the optical fiber cable 2 is not output to the optical communication device 3, but is output to the tower deterioration detection device 5. In this manner, the function of the filter unit 4 is achieved.

The optical signal reception unit 11 receives the optical signal from the optical fiber cable 2. More specifically, as described above, the component associated with the back scattered light is separated by the filter unit 4, and the optical signal containing the separated component is received by the optical signal reception unit 11.

The deterioration detection unit 12 detects deterioration of each of the towers 1 by using the optical signal that is received by the optical signal reception unit 11. More specifically, the deterioration detection unit 12 detects presence or absence of deterioration of each of the towers 1, and detects a degree of deterioration of each of the towers 1. Alternatively, the deterioration detection unit 12 detects an indication of deterioration of each of the towers 1. Specific examples of a detection method performed by the deterioration detection unit 12 are described later with reference to FIG. 7 to FIG. 12D.

The output control unit 13 executes control for outputting information indicating a detection result by the deterioration detection unit 12 (hereinafter, referred to as "detection result information"). The detection result information is output by using the output device 6. For example, the output device 6 includes at least one of a display device, a sound output device, and a communication device. The display device is configured by using a display screen, for example. The sound output device is configured by using a speaker, for example. The communication device is configured by using a dedicated transmitter and a dedicated receiver, for example.

In other words, the output control unit 13 executes control for displaying an image containing the detection result information. The image is displayed by using the display device in the output device 6. Alternatively, the output control unit 13 executes control for outputting a sound associated with the detection result information. The sound is output by using the sound output device in the output device 6. Alternatively, the output control unit 13 executes control for transmitting a signal associated with the detection result information. The signal is transmitted by using the communication device in the output device 6.

In this manner, the main parts of the tower deterioration detection system 100 are configured.

Hereinafter, the optical signal reception unit 11 is referred to as an "optical signal reception means" in some cases. Further, the deterioration detection unit 12 is referred to as a "deterioration detection means" in some cases. Further, the output control unit 13 is referred to as an "output control means" in some cases.

Figure 3:
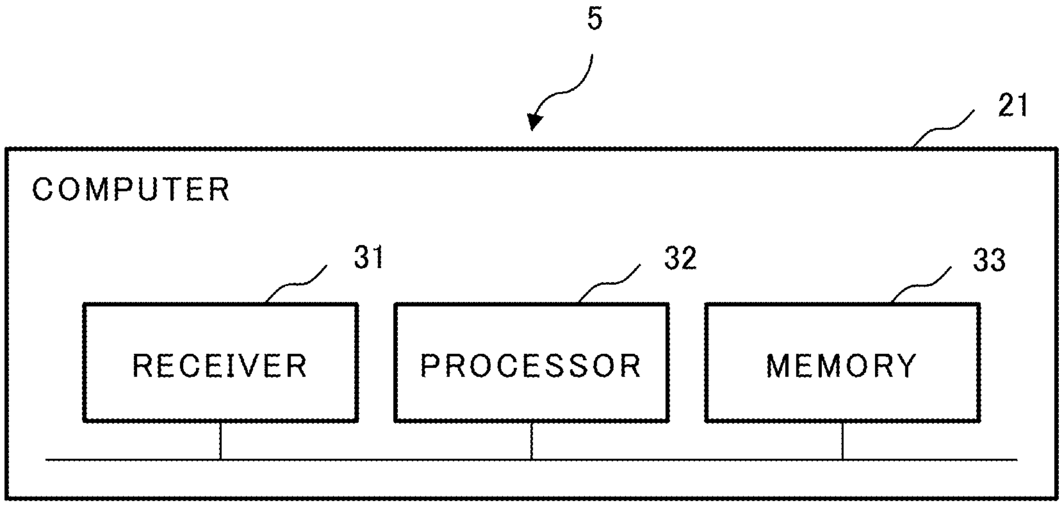
FIG. 3 is a block diagram illustrating a hardware configuration of main parts of a tower deterioration detection device according to the second example embodiment.
Figure 4:
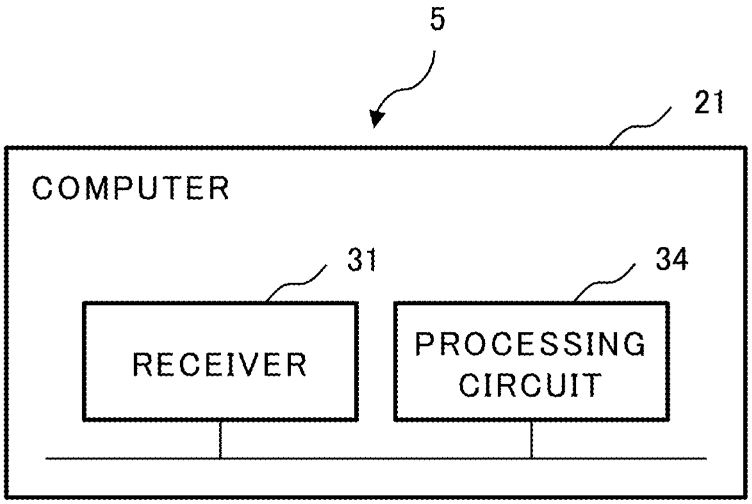
FIG. 4 is a block diagram illustrating another hardware configuration of the main parts of the tower deterioration detection device according to the second example embodiment.
Figure 5:
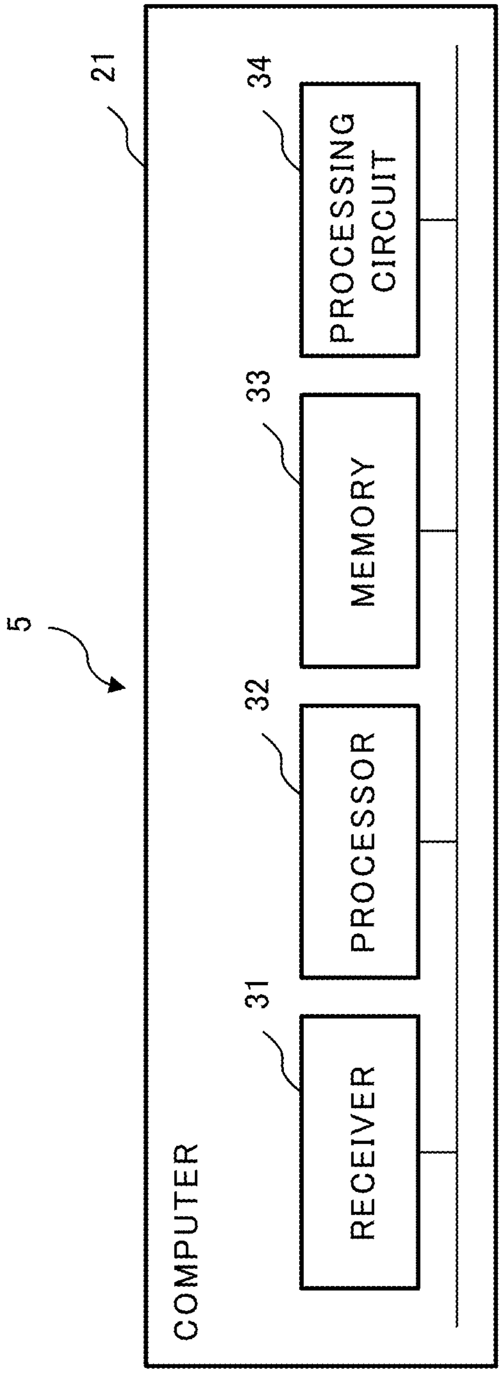
FIG. 5 is a block diagram illustrating another hardware configuration of the main parts of the tower deterioration detection device according to the second example embodiment.

Next, with reference to FIGS. 3 to 5, a hardware configuration of main parts of the tower deterioration detection device 5 is described.

As illustrated in FIGS. 3 to 5, the tower deterioration detection device 5 is configured by using a computer 21. The computer 21 may be provided to the same place as the place where the optical communication device 3 is installed (for example, a building for the OPGW). Alternatively, the computer 21 may be provided to another place (for example, within a cloud network). Alternatively, some of the elements of the computer 21 (more specifically, a receiver 31) may be provided to the same place, and the remaining elements of the computer 21 may be provided to the other place.

As illustrated in FIG. 3, the computer 21 includes the receiver 31, a processor 32, and a memory 33. The memory 33 stores a program for causing the computer 21 to function as the optical signal reception unit 11, the deterioration detection unit 12, and the output control unit 13 (including a program for causing the receiver 31 to function as the optical signal reception unit 11). The processor 32 reads out and executes the program stored in the memory 33. With this, a function F1 of the optical signal reception unit 11, a function F2 of the deterioration detection unit 12, and a function F3 of the output control unit 13 are achieved.

As illustrated in FIG. 4, the computer 21 includes the receiver 31 and a processing circuit 34. The processing circuit 34 executes processing for causing the computer 21 to function as the optical signal reception unit 11, the deterioration detection unit 12, and the output control unit 13 (including processing for causing the receiver 31 to function as the optical signal reception unit 11). With this, the functions F1 to F3 are achieved.

Alternatively, as illustrated in FIG. 5, the computer 21 includes the receiver 31, the processor 32, the memory 33, and the processing circuit 34. In this case, some functions of the functions F1 to F3 are achieved by the processor 32 and the memory 33, and the remaining functions of the functions F1 to F3 are achieved by the processing circuit 34.

The processor 32 is configured by one or more processors. For example, each processor is configured by using a central processing unit (CPU), a graphics processing unit (GPU), a microprocessor, a microcontroller, or a digital signal processor (DSP).

The memory 33 is configured by one or more memories. For example, each memory is configured by using a random-access memory (RAM), a read-only memory (ROM), a flash memory, an erasable programmable read-only memory (EPROM), an electrically erasable programmable read-only memory (EEPROM), a solid-state drive, a hard disk drive, a flexible disk, a compact disc, a digital versatile disc (DVD), a Blu-ray disc, a magneto-optical (MO) disc, or a mini disc.

The processing circuit 34 is configured by one or more processing circuits. For example, each processing circuit is configured by using an application specific integrated circuit (ASIC), a programmable logic device (PLD), a field programmable gate array (FPGA), a system on a chip (SoC), or a system large scale integration (LSI).

The processor 32 may include a dedicated processor for each of the functions F1 to F3. The memory 33 may include a dedicated memory for each of the functions F1 to F3. The processing circuit 34 may include a dedicated processing circuit for each of the functions F1 to F3.

Figures 6, 7:
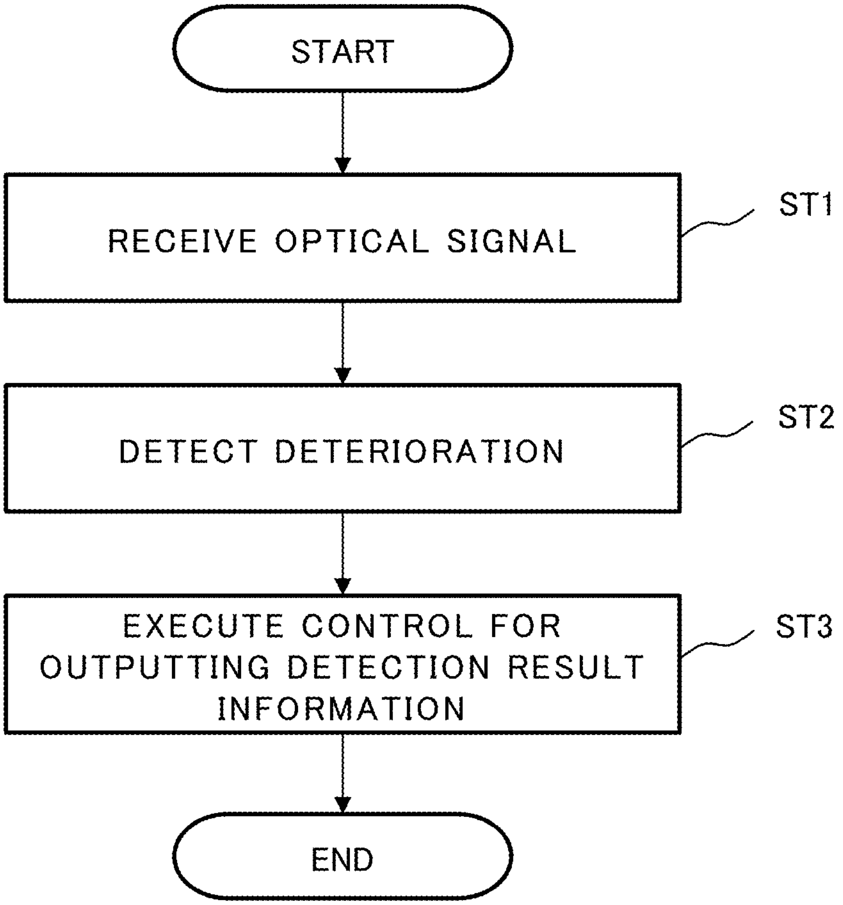
FIG. 6 is a flowchart illustrating an operation of the tower deterioration detection device according to the second example embodiment.
FIG. 7 is an explanatory diagram illustrating an example of tower information used by a deterioration detection unit.

Next, with reference to the flowchart illustrated in FIG. 6, an operation of the tower deterioration detection device 5 is described.

First, the optical signal reception unit 11 receives the optical signal from the optical fiber cable 2 (step ST1). Subsequently, the deterioration detection unit 12 detects deterioration of each of the towers 1 by using the optical signal being received (step ST2). Subsequently, the output control unit 13 executes control for outputting information indicating the result of the detection (in other words, the detection result information) (step ST3).

For example, it is assumed that "absence" of deterioration is detected in step ST2. In this case, the detection result information indicating "absence" of deterioration is output in step ST3. Alternatively, for example, it is assumed that "presence" of deterioration is detected and a degree of the deterioration is detected in step ST2. In this case, in step ST3, the detection result information indicating "presence" of deterioration and a degree of the deterioration (for example, any value of two-stage values) is output.

Figure 8A:
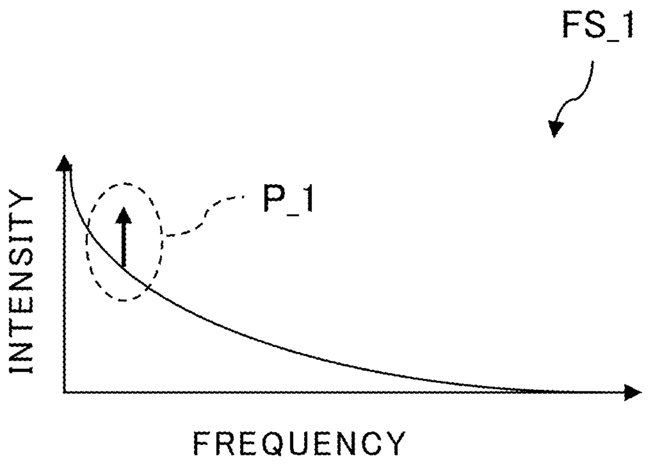
FIG. 8A is an explanatory diagram illustrating an example of a frequency spectrum associated with a vibration pattern of a tower without deterioration.
Figure 8B:
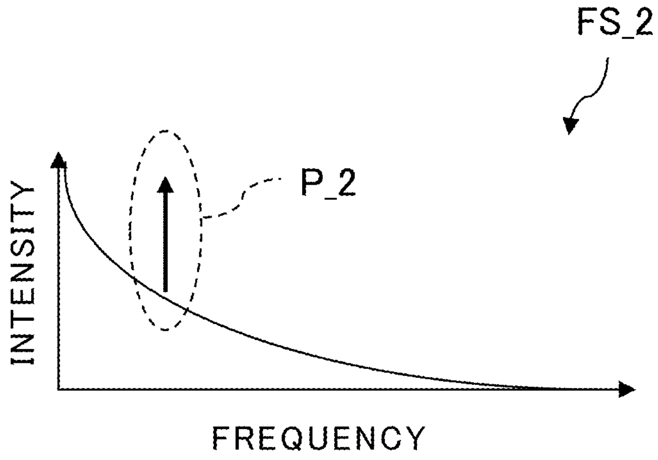
FIG. 8B is an explanatory diagram illustrating an example of a frequency spectrum associated with a vibration pattern of a tower with deterioration.

Next, with reference to FIG. 7, FIG. 8A, and FIG. 8B, a first specific example of the detection method performed by the deterioration detection unit 12 is described. In the first specific example, the deterioration detection unit 12 detects presence or absence of deterioration of each of the towers 1, and detects a degree of the deterioration.

First, the optical communication device 3 outputs a pulsed optical signal. The optical signal being output is input to the optical fiber cable 2 via the filter unit 4. When the optical signal is input, back scattered light is generated inside the optical fiber cable 2. As described above, the optical signal received by the optical signal reception unit 11 is acquired after separation performed by the filter unit 4, and contains the component associated with the back scattered light being generated (hereinafter, referred to as "back scattered light component").

In this state, the optical signal received by the optical signal reception unit 11 contains the component associated with the back scattered light generated at a position of the optical fiber cable 2 that is associated with each of the towers 1. In other words, the optical signal being received contains the back scattered light component associated with each of the towers 1. Timing at which the back scattered light component is received differs according to a distance D between a position at which the associated tower 1 is installed and a position at which the tower deterioration detection device 5 is installed (more specifically, a position at which the receiver 31 is installed). Herein, the distance D is a path distance along the optical fiber cable 2.

Herein, the back scattered light component contained in the optical signal received by the optical signal reception unit 11 indicates a different pattern according to vibration of the associated tower 1 (hereinafter, referred to as a "vibration pattern"). In other words, the optical signal being received contains the vibration pattern associated with each of the towers 1. Deterioration detection performed by the deterioration detection unit 12 is based on the vibration pattern.

In other words, deterioration of each of the towers 1 causes a structural abnormality. Specifically, for example, at least one of a loosen screw, peeling of coating, and generation of rust is caused. When the structural abnormality is caused, the vibration pattern changes. Specifically, for example, an attenuation time T of a time waveform TW indicating the vibration pattern changes. Further, for example, a peak frequency of a frequency spectrum FS indicating the vibration pattern changes. Thus, presence or absence of deterioration of each of the towers 1 (more specifically, deterioration based on the structural abnormality) can be detected based on the vibration pattern.

Further, in this state, a change amount of the vibration pattern (for example, a change amount of the attenuation time T or a change amount of the peak frequency) differs according to a degree of deterioration. More specifically, as the degree of deterioration is higher, the change amount has a greater value. Thus, a degree of deterioration of each of the towers 1 (more specifically, deterioration based on the structural abnormality) can be detected based on the vibration pattern.

The tower deterioration detection device 5 (more specifically, the memory 33 or a storage area of the processing circuit 34) stores information relating to each of the towers 1 (hereinafter, referred to as "tower information"). The tower information includes information indicating the distanced D associated with each of the towers 1 (hereinafter, referred to as "distance information"). Further, the tower information includes information for identifying each of the towers 1 (hereinafter, referred to as "identification information"). For example, the identification information includes an identifier allocated to each of the towers 1. FIG. 7 illustrates an example of the tower information.

The tower deterioration detection device 5 acquires information indicating timing at which the optical communication device 3 outputs a pulsed optical signal. The information is acquired from the optical communication device 3, for example. The deterioration detection unit 12 calculates a time difference between the timing indicated in the acquired information and the timing at which the optical signal reception unit 11 receives the back scattered light component. The deterioration detection unit 12 calculates a distance D' between the position at which the back scattered light component is generated and the position at which the receiver 31 is installed, based on the calculated time difference. Herein, the distance D' is a path distance along the optical fiber cable 2.

The deterioration detection unit 12 compares the distance D' being calculated with each of the distances D indicated in the distance information included in the tower information. With this, the deterioration detection unit 12 detects the back scattered light component associated with each of the towers 1 from the back scattered light components contained in the optical signals being received. As a result, the vibration pattern associated with each of the towers 1 is detected. More specifically, the time waveform TW indicating the vibration pattern associated with each of the towers 1 is detected.

Subsequently, the deterioration detection unit 12 executes fast Fourier transform (FFT) for the time waveform being detected. With this, a frequency spectrum FS indicating the vibration pattern associated with each of the towers 1 is calculated.

FIG. 8A illustrates an exemplary image of a frequency spectrum FS_1 indicating a vibration pattern associated with the tower 1 without deterioration. In contrast, FIG. 8B illustrates an exemplary image of a frequency spectrum FS_2 indicating a vibration pattern associated with the tower 1 with deterioration. P_1 in FIG. 8A indicates a peak of the frequency spectrum FS_1. P_2 in FIG. 8B indicates a peak of the frequency spectrum FS_2.

As described above, the peak frequency of the frequency spectrum FS changes due to deterioration of the associated tower 1. In the examples illustrated in FIG. 8A and FIG. 8B, the peak frequency of the frequency spectrum FS_2 (see FIG. 8B) has a value different from the peak frequency of the frequency spectrum FS_1 (see FIG. 8A).

A reference value to be compared with the peak frequency is set in the deterioration detection unit 12. The reference value is set to be a value equivalent to the peak frequency of the frequency spectrum FS indicating the vibration pattern associated with the tower 1 without deterioration. Specifically, for example, the reference value is set to a value equivalent to the peak frequency of the frequency spectrum FS_1 illustrated in FIG. 8A.

The deterioration detection unit 12 detects the peak frequency of the frequency spectrum FS that is calculated as described above. The deterioration detection unit 12 compares the peak frequency being detected with the reference value that is set as described above. With this, the deterioration detection unit 12 determines presence or absence of deterioration of the associated tower 1. In this manner, presence or absence of deterioration of each of the towers 1 is detected.

Further, as described above, according to a degree of deterioration of each of the towers 1, a change amount of the peak frequency of the frequency spectrum FS being associated therewith differs. In view of this, the tower deterioration detection device 5 (more specifically, the memory 33 or a storage area of the processing circuit 34) stores information indicating a correlation between a value indicating a degree of deterioration (for example, a two-stage value) and a value indicating a change amount of the peak frequency. The deterioration detection unit 12 calculates a change amount of the peak frequency being detected as described above with respect to the reference value being set as described above. The deterioration detection unit 12 determines a degree of deterioration associated with the change amount being calculated, by using the information being stored. With this, a degree of deterioration of the associated tower 1 is detected.

Figure 9A:
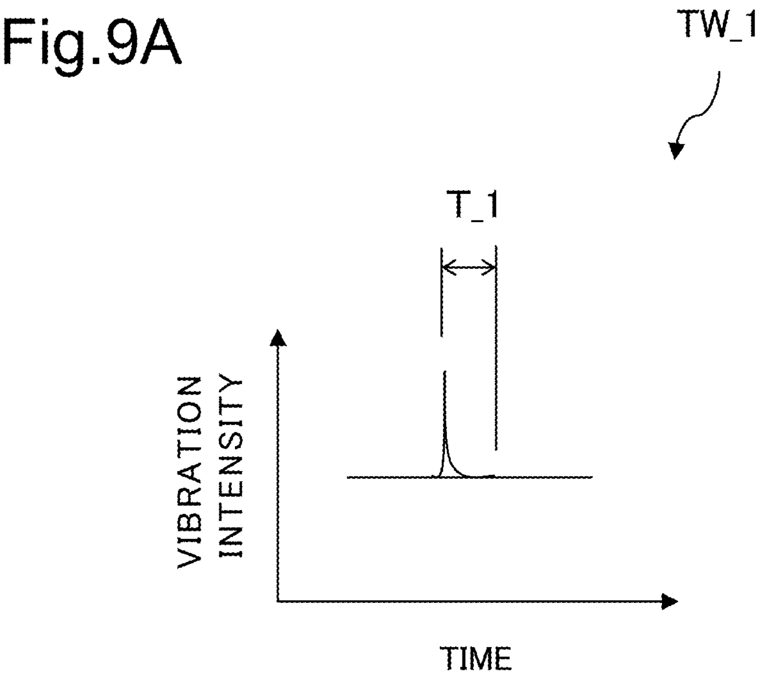
FIG. 9A is an explanatory diagram illustrating an example of a time waveform associated with the vibration pattern of the tower without deterioration.
Figure 9B:
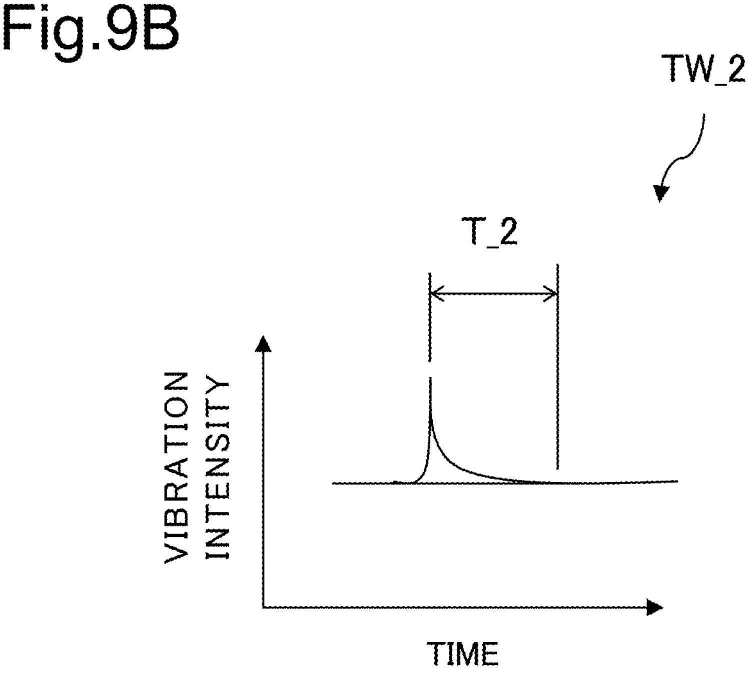
FIG. 9B is an explanatory diagram illustrating an example of a time waveform associated with the vibration pattern of the tower with deterioration.

Next, with reference to FIG. 9A and FIG. 9B, a second specific example of the detection method performed by the deterioration detection unit 12 is described. In the second specific example, the deterioration detection unit 12 detects presence or absence of deterioration of each of the towers 1, and detects a degree of the deterioration.

The deterioration detection unit 12 detects the back scattered light component associated with each of the towers 1 by performing a detection method similar to the detection method described in the first specific example. As a result, the vibration pattern associated with each of the towers 1 is detected. More specifically, the time waveform TW indicating the vibration pattern associated with each of the towers 1 is detected.

Herein, when irregular vibration is caused at each of the towers 1 due to an external factor, a pulsed waveform is generated in the time waveform TW being associated therewith. In this state, the attenuation time T of the pulse has a different value according to presence or absence of deterioration of the associated tower 1. Further, a change amount of the attenuation time T of the pulse has a different value according to a degree of deterioration of the associated tower 1. This is as described in the first specific example.

FIG. 9A illustrates an exemplary image of a time waveform TW_1 indicating the vibration pattern associated with the tower 1 without deterioration. In contrast, FIG. 9B illustrates an exemplary image of a time waveform TW_2 indicating the vibration pattern associated with the tower 1 with deterioration. T_1 in FIG. 9A indicates an attenuation time of a pulse of the time waveform TW_1. T_2 in FIG. 9B indicates an attenuation time of a pulse of the time waveform TW_2.

A reference value to be compared with the attenuation time T is set in the deterioration detection unit 12. The reference value is set to be a value equivalent to the attenuation time T of the time waveform TW indicating the vibration pattern associated with the tower 1 without deterioration. Specifically, for example, the reference value is set to a value equivalent to an attenuation time T_1 of a time waveform TW_1 illustrated in FIG. 9A.

When the time waveform TW detected as described above includes a pulsed waveform, the deterioration detection unit 12 calculates the attenuation time T of the pulse. The deterioration detection unit 12 compares the attenuation time T being calculated with the reference value being set as described above. With this, the deterioration detection unit 12 detects presence or absence of deterioration of the associated tower 1.

Further, the tower deterioration detection device 5 (more specifically, the memory 33 or a storage area of the processing circuit 34) stores information indicating a correlation between a value indicating a degree of deterioration (for example, a two-stage value) and a value indicating a change amount of the attenuation time T. The deterioration detection unit 12 calculates a change amount of the attenuation time T being calculated as described above with respect to the reference value being set as described above. The deterioration detection unit 12 determines a degree of deterioration associated with the change amount being calculated, by using the information being stored. With this, a degree of deterioration of the associated tower 1 is detected.

Figure 11:
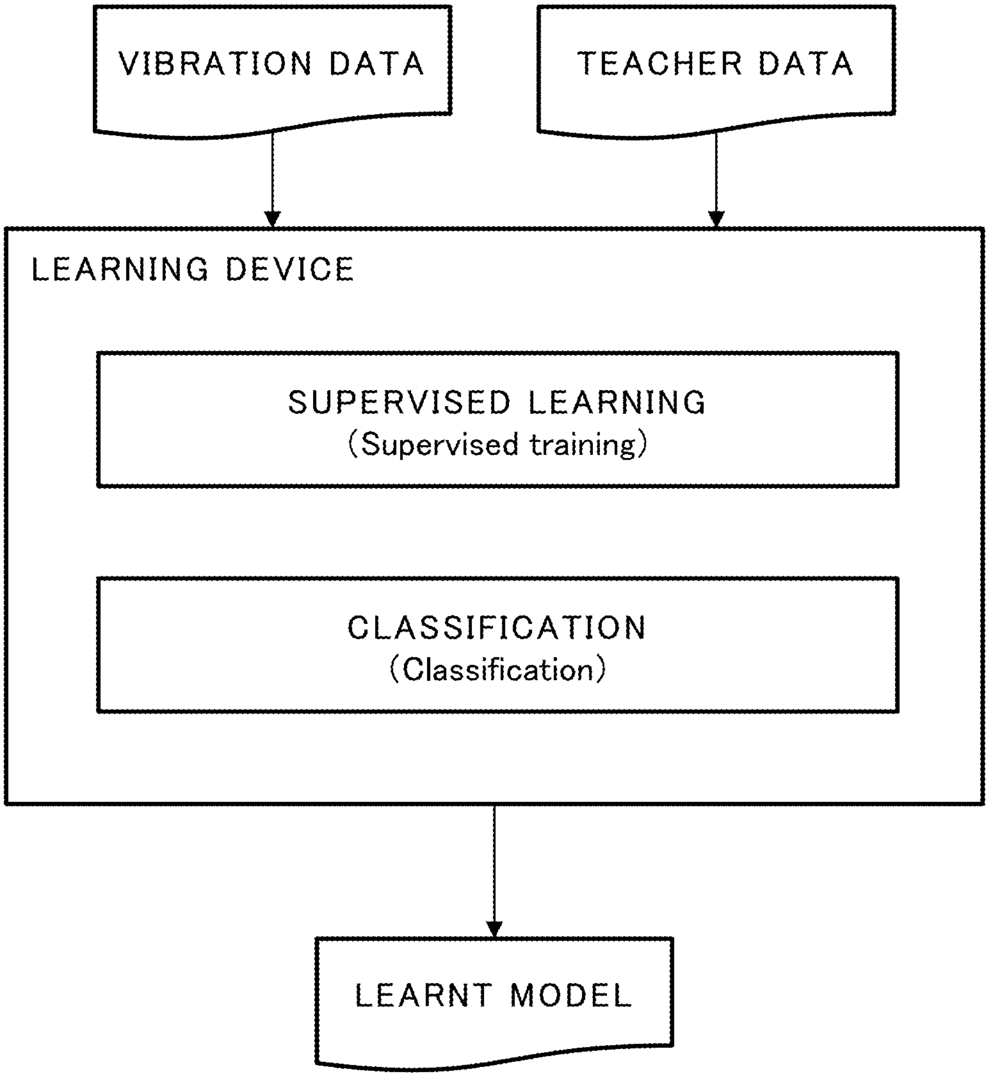
FIG. 11 is an explanatory diagram illustrating an example of a learning device used for machine learning.

Next, with reference to FIG. 10 and FIG. 11, a third specific example of the detection method performed by the deterioration detection unit 12 is described. In the third specific example, the deterioration detection unit 12 detects presence or absence of deterioration of each of the towers 1, and detects a degree of the deterioration.

In the third specific example, a learnt model generated by machine learning is used. More specifically, in the third specific example, a learnt model generated by supervised learning is used. Hereinafter, the machine learning is described.

Firstly, as training input data used for the machine learning, data indicating a plurality of vibration patterns (hereinafter, referred to as "vibration data") are prepared. The vibration data include a vibration pattern associated with each deterioration state of each of the towers 1. Secondly, as teacher data used for the machine learning (in other words, correct data), data indicating the tower 1 and the deterioration state that are associated with each of the vibration patterns included in the vibration data are prepared. FIG. 10 illustrates an example of those data (initial training data).

A plurality of vibration data among the initial training data illustrated in FIG. 10 are input to the dedicated learning device (see FIG. 11). The learning device generates the learnt model by executing the machine learning using those vibration data as the training input data. For example, the learning device receives the training input data indicating the vibration pattern associated with each of the towers 1. The learning device executes the machine learning for the training input data, and repeats the learning processing in association with each of the towers 1 until correct data are acquired at a predetermined accuracy. As a result, the learnt pattern associated with each of the towers 1 is generated. Subsequently, the learning device uses input data being new vibration data as input data relating to the learnt pattern, and performs classification for presence or absence of deterioration and a degree of deterioration for each of the towers 1. As a result, the learning device outputs information indicating presence or absence of deterioration of each of the towers 1 and a degree of deterioration. FIG. 11 illustrates an example of the learning processing and the classification processing of the machine learning of the learning device. In this manner, the learnt model is generated.

For the machine learning of the learning device, various publicly known techniques, for example, a support vector machine (SVM) or a neural network may be used. Details of those techniques are omitted in the description.

The deterioration detection unit 12 detects the vibration pattern associated with each of the towers 1 by using the optical signal received by the optical signal reception unit 11 (see the first specific example). The deterioration detection unit 12 generates the data indicating the vibration pattern being detected. Herein, the deterioration detection unit 12 includes the learnt model being generated as described above. The deterioration detection unit 12 inputs the vibration data being generated to the learnt model. Then, the learnt model outputs the information indicating presence or absence of deterioration of the associated tower 1 and a degree of deterioration. With this, presence or absence of deterioration of each of the towers 1 is detected, and a degree of deterioration of each of the towers 1 is detected.

Next, with reference to FIGS. 12A to 12D, a fourth specific example of the detection method performed by the deterioration detection unit 12 is described. In the fourth specific example, the deterioration detection unit 12 detects an indication of deterioration of each of the towers 1.

Figure 12A:
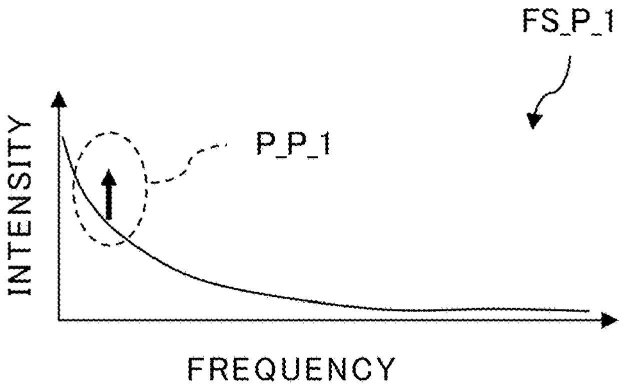
FIG. 12A is an explanatory diagram illustrating an example of a frequency spectrum associated with a vibration pattern of a tower at a past time point.
Figure 12B:
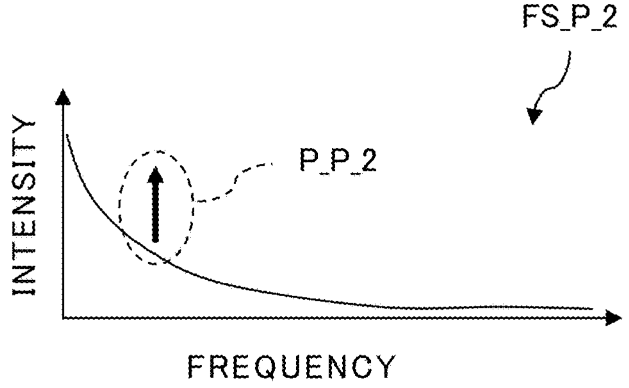
FIG. 12B is an explanatory diagram illustrating an example of a frequency spectrum associated with a vibration pattern of a tower at another past time point.
Figure 12C:
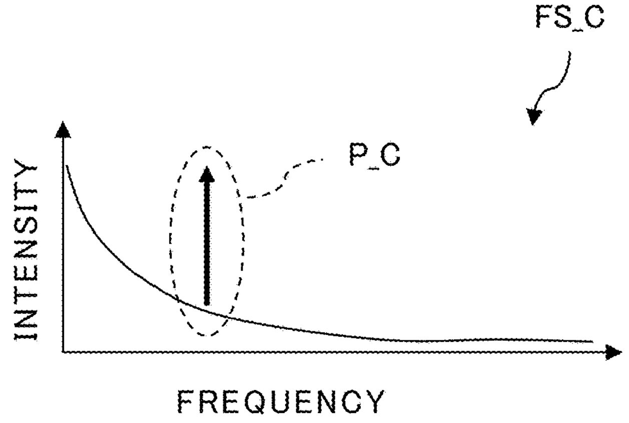
FIG. 12C is an explanatory diagram illustrating an example of a frequency spectrum associated with a vibration pattern of a tower at a current time point.

The deterioration detection unit 12 regularly executes detection of the peak frequency as in the first specific example. With this, for example, it is assumed that peak frequencies at a plurality of past time points and a peak frequency at a current time point are detected. FIG. 12A illustrates an example of a frequency spectrum FS_P_1 at a past time point (for example, two years ago). FIG. 12B illustrates an example of a frequency spectrum FS_P_2 at a past time point (for example, a year ago). FIG. 12C illustrates an example of a frequency spectrum FS_C at a current time point (for example, the current year). P_P_1 in FIG. 12A indicates a peak of the frequency spectrum FS_P_1. P_P_2 in FIG. 12B indicates a peak of the frequency spectrum FS_P_2. P_C in FIG. 12C indicates a peak of the frequency spectrum FS_C.

Figure 12D:
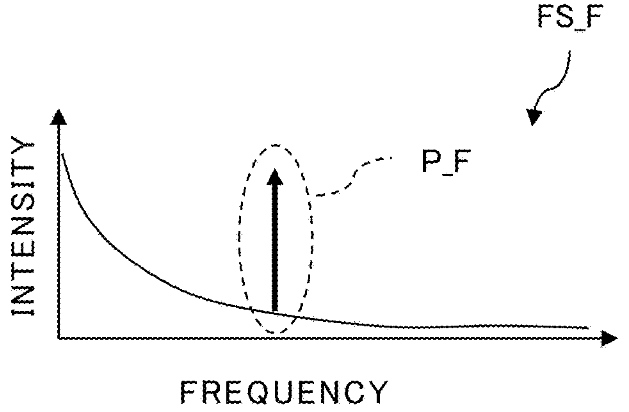
FIG. 12D is an explanatory diagram illustrating an example of a frequency spectrum associated with a vibration pattern of a tower at a future time point.

The deterioration detection unit 12 predicts a peak frequency at a future time point, based on those peak frequencies. For example, a least-squares method is used for the prediction. FIG. 12D illustrates an example of a frequency spectrum FS_F at a future time point (for example, next year). P_F in FIG. 12D indicates a peak of the frequency spectrum FS_F.

The deterioration detection unit 12 compares the peak frequency being predicted with a reference value similar to the reference value in the first specific example. With this, for each of the towers 1, the deterioration detection unit 12 predicts presence or absence of deterioration at a future time point, and predicts a degree of deterioration at a future time point.

For example, it is assumed that deterioration at a future time point is predicted. In this case, the deterioration detection unit 12 determines that the associated tower 1 has an indication of deterioration. In contrast, it is assumed that deterioration at a future time point is not predicted. In this case, the deterioration detection unit 12 determines that the associated tower 1 does not have an indication of deterioration. In this manner, an indication of deterioration of each of the towers 1 is detected.

Next, effects exerted by using the tower deterioration detection system 100 are described.

Firstly, as described above, deterioration of each of the towers 1 can be detected. In this state, so-called "remote" detection can be achieved. In other words, for detecting deterioration of each of the towers 1, a worker is not required to climb each of the towers 1, or a worker is not required to detect deterioration by direct visual observation.

Secondly, for detecting deterioration of each of the towers 1, an existing optical fiber cable 2 (for example, the optical fiber cable 2 for the OPGW) can be used. With this, an optical fiber cable dedicated for detecting deterioration is not required. As a result, work for installing the optical fiber cable is not required.

Thirdly, as compared to the technique described in PTL 1, the configuration can be simplified. In other words, it is assumed that the technique described in PTL 1 is diverted for detecting deterioration of each of the towers 1. In this case, installation of a pulse generation device is required, and installation of a measurement device is required. Further, when the measurement device uses an electric type sensor, installation of a dedicated power source is also required. In contrast, those devices are not required by using the tower deterioration detection system 100. In particular, the tower deterioration detection system 100 uses optical fiber sensing in place of the electric type sensor. Thus, the power source dedicated for the electric type sensor is not required.

Next, a modification example of the tower deterioration detection system 100 is described.

In the example illustrated in FIG. 1 and FIG. 2, the optical communication device 3, the filter unit 4, and the tower deterioration detection device 5 are provided to one end of the optical fiber cable 2. Instead, the optical communication device 3, the filter unit 4, and the tower deterioration detection device 5 may be provided to each of both the ends of the optical fiber cable 2.

Next, another modification example of the tower deterioration detection system 100 is described.

The tower deterioration detection system 100 may use a plurality of optical fiber cables (omitted in illustration) in place of the one optical fiber cable 2. For example, the plurality of optical fiber cables are provided along paths different from each other within a power transmission network or a power distribution network including the towers 1_1 to 1_N. In this case, the optical signal reception unit 11 receives an optical signal from each of the plurality of optical fiber cables. For each of the plurality of optical fiber cables, the deterioration detection unit 12 executes processing similar to the processing described in the first specific example, the second specific example, the third specific example, or the fourth specific example. With this, deterioration of each of the towers 1_1 to 1_N is detected.

Next, with reference to FIG. 13, another example modification of the tower deterioration detection system 100 is described.

The tower information is not limited to the example illustrated in FIG. 7. In other words, the information included in the tower information is not limited to the distance information and the identification information. In addition to the distance information and the identification information, the tower information may include other information (hereinafter, referred to as "additional information"). FIG. 13 illustrates an example of the tower information including the additional information. In the example illustrated in FIG. 13, the additional information includes information indicating a material of each of the towers 1, information indicating a height of each of the towers 1, and information indicating a construction year or an installation year of each of the towers 1.

As described in the first specific example, the vibration pattern associated with each of the towers 1 differs according to presence or absence of deterioration and a degree of deterioration. In addition, the vibration pattern associated with each of the towers 1 may differ according to a material, a height, a construction year or an installation year, and the like.

In view of this, for example, when the deterioration detection unit 12 executes the processing described in the first specific example, the second specific example, or the fourth specific example, the reference value is set in the following manner. In other words, the deterioration detection unit 12 sets the reference value for each of the towers 1, according to a height, a material, and a construction year or an installation year that are indicated in the additional information. The reference value is set based on a predetermined rule. Deterioration of each of the towers 1 can be detected more accurately by using the reference value.

Figure 14:
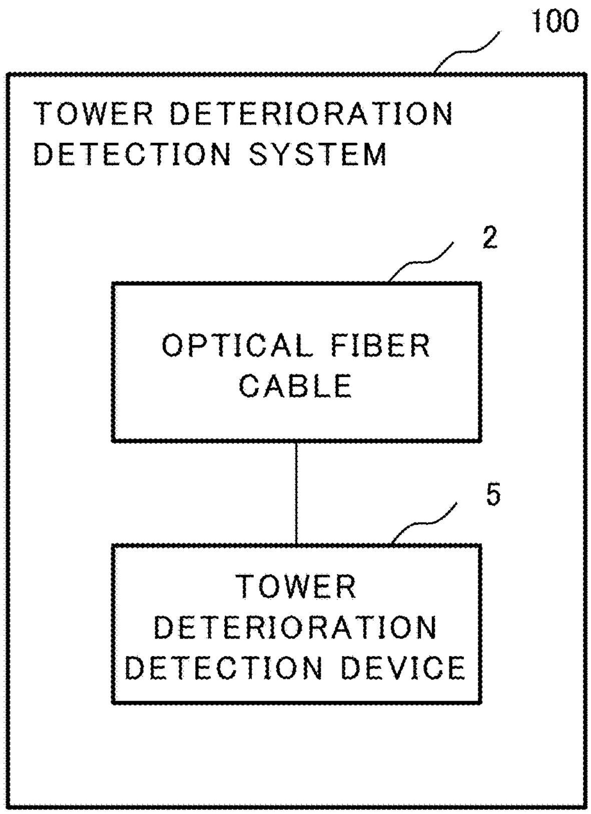
FIG. 14 is a block diagram illustrating main parts of another tower deterioration detection system according to the second example embodiment.

Next, with reference to FIG. 14, another modification example of the tower deterioration detection system 100 is described.

As illustrated in FIG. 14, the tower deterioration detection system 100 may include the optical fiber cable 2 and the tower deterioration detection device 5. In other words, the main parts of the tower deterioration detection system 100 may be configured by the optical fiber cable 2 and the tower deterioration detection device 5. In this case, the tower deterioration detection device 5 may include a function of outputting a pulsed optical signal to the optical fiber cable 2.

Figure 15:
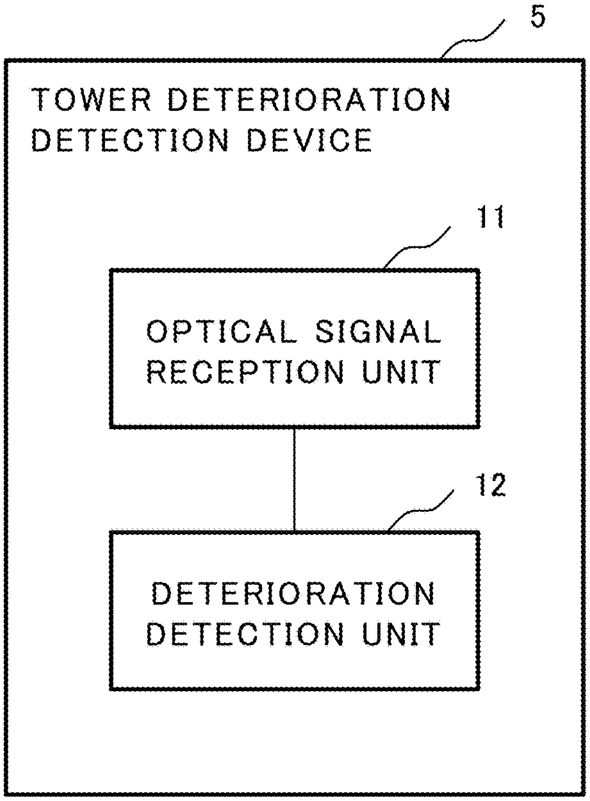
FIG. 15 is a block diagram illustrating main parts of another tower deterioration detection device according to the second example embodiment.

Next, with reference to FIG. 15, a modification example of the tower deterioration detection device 5 is described.

As illustrated in FIG. 15, the tower deterioration detection device 5 may include the optical signal reception unit 11 and the deterioration detection unit 12. In other words, the main parts of the tower deterioration detection device 5 may be configured by the optical signal reception unit 11 and the deterioration detection unit 12. In this case, the output control unit 13 may be provided to the output device 6. In this case, the effects described above can also be exerted.

In other words, the optical signal reception unit 11 receives the optical signal from the optical fiber cable 2 provided to the tower 1. The deterioration detection unit 12 detects deterioration of the tower 1, based on the vibration pattern of the tower 1 that is indicated in the optical signal. With this, deterioration of each of the towers 1 can be detected. In particular, the deterioration can be detected remotely. Further, a power source for an electric type sensor or the like that is used in the technique described in PTL 1 is not required, and hence the deterioration can be detected with a simplified configuration.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or a part of the example embodiments described above can be described as, but not limited to, the following supplementary notes.

SUPPLEMENTARY NOTES (Supplementary Note 1)

A tower deterioration detection device including:

an optical signal reception means for receiving an optical signal from an optical fiber cable provided to a tower; and a deterioration detection means for detecting deterioration of the tower, based on a vibration pattern of the tower that is indicated in the optical signal.

(Supplementary Note 2)

The tower deterioration detection device according to Supplementary Note 1, wherein the deterioration detection means detects the deterioration based on a structural abnormality of the tower.

(Supplementary Note 3)

The tower deterioration detection device according to Supplementary Note 2, wherein the structural abnormality includes at least one of a loosen screw of the tower, peeling of coating of the tower, and generation of rust of the tower.

(Supplementary Note 4)

The tower deterioration detection device according to any one of Supplementary Notes 1 to 3, wherein the optical signal reception means receives the optical signal from the optical fiber cable provided to a plurality of the towers.

(Supplementary Note 5)

The tower deterioration detection device according to Supplementary Note 4, wherein the deterioration detection means detects the deterioration of each of the towers.

(Supplementary Note 6)

The tower deterioration detection device according to any one of Supplementary Notes 1 to 5, wherein the deterioration detection means detects presence or absence of the deterioration, and detects a degree of the deterioration.

(Supplementary Note 7)

The tower deterioration detection device according to any one of Supplementary Notes 1 to 5, wherein the deterioration detection means detects a sign of the deterioration.

(Supplementary Note 8)

The tower deterioration detection device according to any one of Supplementary Notes 1 to 7, further including an output control means for executing control for outputting information indicating a result of detection by the deterioration detection means.

(Supplementary Note 9)

A tower deterioration detection system including:

the tower deterioration detection device according to any one of Supplementary Notes 1 to 8; and the optical fiber cable.

(Supplementary Note 10)

The tower deterioration detection system according to Supplementary Note 9, wherein the optical fiber cable is provided inside an overhead ground wire.

(Supplementary Note 11)

The tower deterioration detection system according to Supplementary Note 9, wherein the optical fiber cable is for communication or sensing.

(Supplementary Note 12)

A tower deterioration detection method including:

receiving, by an optical signal reception means, an optical signal from an optical fiber cable provided to a tower; and detecting deterioration of the tower by a deterioration detection means, based on a vibration pattern of the tower that is indicated in the optical signal.

(Supplementary Note 13)

The tower deterioration detection method according to Supplementary Note 12, wherein the deterioration detection means detects the deterioration based on a structural abnormality of the tower.

(Supplementary Note 14)

The tower deterioration detection method according to Supplementary Note 13, wherein the structural abnormality includes at least one of a loosen screw of the tower, peeling of coating of the tower, and generation of rust of the tower.

(Supplementary Note 15)

The tower deterioration detection method according to any one of Supplementary Notes 12 to 14, wherein the optical signal reception means receives the optical signal from the optical fiber cable provided to a plurality of the towers.

(Supplementary Note 16)

The tower deterioration detection method according to Supplementary Note 15, wherein the deterioration detection means detects the deterioration of each of the towers.

(Supplementary Note 17)

The tower deterioration detection method according to any one of Supplementary Notes 12 to 16, wherein the deterioration detection means detects presence or absence of the deterioration, and detects a degree of the deterioration.

(Supplementary Note 18)

The tower deterioration detection method according to any one of Supplementary Notes 12 to 16, wherein the deterioration detection means detects a sign of the deterioration.

(Supplementary Note 19)

The tower deterioration detection method according to any one of Supplementary Notes 12 to 18, further including executing, by an output control means, control for outputting information indicating a result of detection by the deterioration detection means.

(Supplementary Note 20)

A recording medium recording a program for causing a computer to function as:

an optical signal reception means for receiving an optical signal from an optical fiber cable provided to a tower; and a deterioration detection means for detecting deterioration of the tower, based on a vibration pattern of the tower that is indicated in the optical signal.

(Supplementary Note 21)

The recording medium according to Supplementary Note 20, wherein the deterioration detection means detects the deterioration based on a structural abnormality of the tower.

(Supplementary Note 22)

The recording medium according to Supplementary Note 21, wherein the structural abnormality includes at least one of a loosen screw of the tower, peeling of coating of the tower, and generation of rust of the tower.

(Supplementary Note 23)

The recording medium according to any one of Supplementary Notes 20 to 22, wherein the optical signal reception means receives the optical signal from the optical fiber cable provided to a plurality of the towers.

(Supplementary Note 24)

The recording medium according to Supplementary Note 23, wherein the deterioration detection means detects the deterioration of each of the towers.

(Supplementary Note 25)

The recording medium according to any one of Supplementary Notes 20 to 24, wherein the deterioration detection means detects presence or absence of the deterioration, and detects a degree of the deterioration.

(Supplementary Note 26)

The recording medium according to any one of Supplementary Notes 20 to 24, wherein the deterioration detection means detects a sign of the deterioration.

(Supplementary Note 27)

The recording medium according to any one of Supplementary Notes 20 to 26, wherein the program further causes the computer to function as an output control means for executing control for outputting information indicating a result of detection by the deterioration detection means.

REFERENCE SIGNS LIST

1 Tower
2 Optical fiber cable
3 Optical communication device
4 Filter unit
5 Tower deterioration detection device
6 Output device
11 Optical signal reception unit
12 Deterioration detection unit
13 Output control unit
21 Computer
31 Receiver
32 Processor
33 Memory
34 Processing circuit
100 Tower deterioration detection system

What is claimed is:

1. A tower deterioration detection device comprising:

one or more memories storing instructions; and one or more processors configured to execute the instructions to:

receive a back scattered light, separated from an optical signal by a filter, including a vibration pattern of the tower from an optical fiber cable provided to a tower; and detect deterioration of the tower, based on an amount of change over time in the vibration pattern in the back scattered light.

2. The tower deterioration detection device according to claim 1, wherein the one or more processors are configured to execute the instructions to detect the deterioration based on a structural abnormality of the tower.

3. The tower deterioration detection device according to claim 2, wherein the structural abnormality includes at least one of a loosen screw of the tower, peeling of coating of the tower, and generation of rust of the tower.

4. The tower deterioration detection device according to claim 1, wherein the one or more processors are configured to execute the instructions to receive the back scattered light from the optical fiber cable provided to a plurality of towers.

5. The tower deterioration detection device according to claim 4, wherein the one or more processors are configured to execute the instructions to detect the deterioration of each of the towers.

6. The tower deterioration detection device according to claim 1, wherein the one or more processors are configured to execute the instructions to detect presence or absence of the deterioration, and-detect a degree of the deterioration.

7. The tower deterioration detection device according to claim 1, wherein the one or more processors are configured to execute the instructions to detect a sign of the deterioration.

8. The tower deterioration detection device according to claim 1, wherein the one or more processors are configured to execute the instructions to execute control for outputting information indicating a result of detection.

9. A tower deterioration detection system comprising:

the tower deterioration detection device according to claim 1; and the optical fiber cable.

10. The tower deterioration detection system according to claim 9, wherein the optical fiber cable is provided inside an overhead ground wire.

11. The tower deterioration detection system according to claim 9, wherein the optical fiber cable is for communication or sensing.

12. A tower deterioration detection method comprising:

by a computer, receiving a back scattered light, separated from an optical signal by a filter, including a vibration pattern of the tower from an optical fiber cable provided to a tower; and detecting deterioration of the tower, based on an amount of change over time in the vibration pattern in the back scattered light.

13. The tower deterioration detection method according to claim 12, wherein the detected deterioration of the tower is based on a structural abnormality of the tower.

14. The tower deterioration detection method according to claim 13, wherein the structural abnormality includes at least one of a loosen screw of the tower, peeling of coating of the tower, and generation of rust of the tower.

15. The tower deterioration detection method according to claim 12, further comprising:

by a computer, receiving the back scattered light from the optical fiber cable provided to a plurality of towers.

16. The tower deterioration detection method according to claim 15, further comprising:

by a computer, detecting the deterioration of each of the towers.

17. The tower deterioration detection method according to claim 12, further comprising:

by a computer, detecting presence or absence of the deterioration.

18. The tower deterioration detection method according to claim 12, further comprising, by a computer, detecting a sign of the deterioration.

19. The tower deterioration detection method according to claim 12, further-comprising:

by a computer, controlling for outputting information indicating a result of detection.

* * * * *